July 7, 1970  B. CLOSE  3,519,732
BUS STRUCTURE COMPRISING A CLAMPING BRACKET AND A COATED
ELECTRIC BUS BAR
Filed July 24, 1969
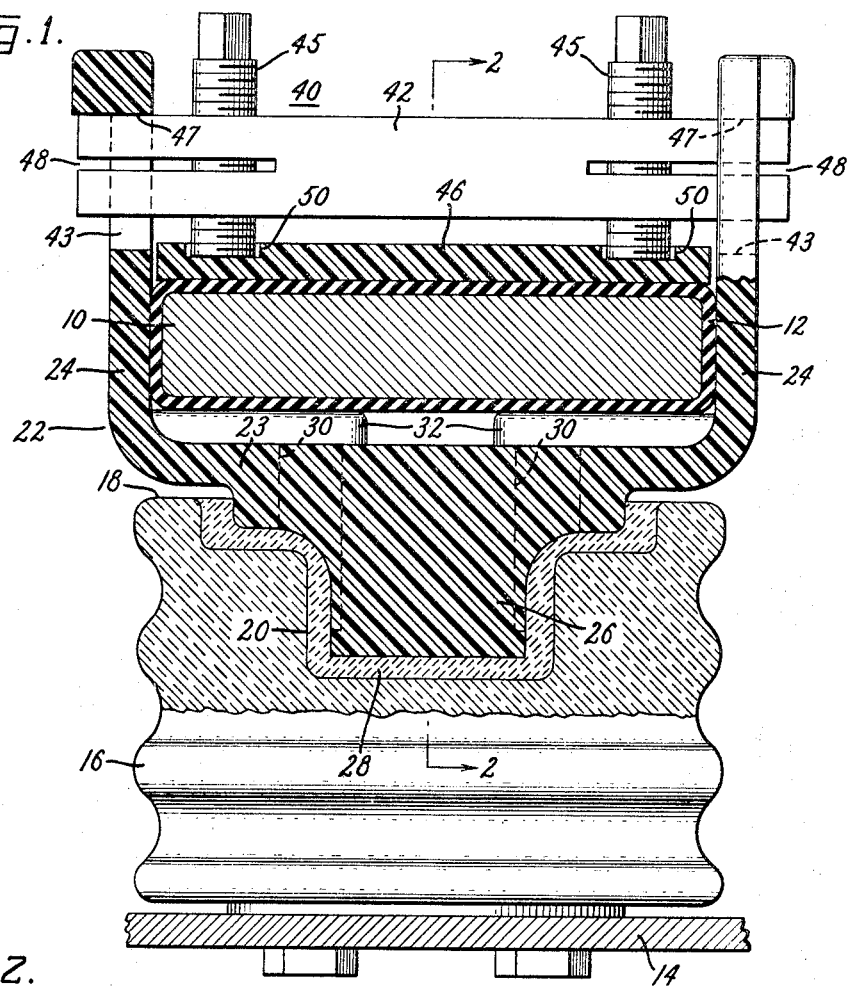
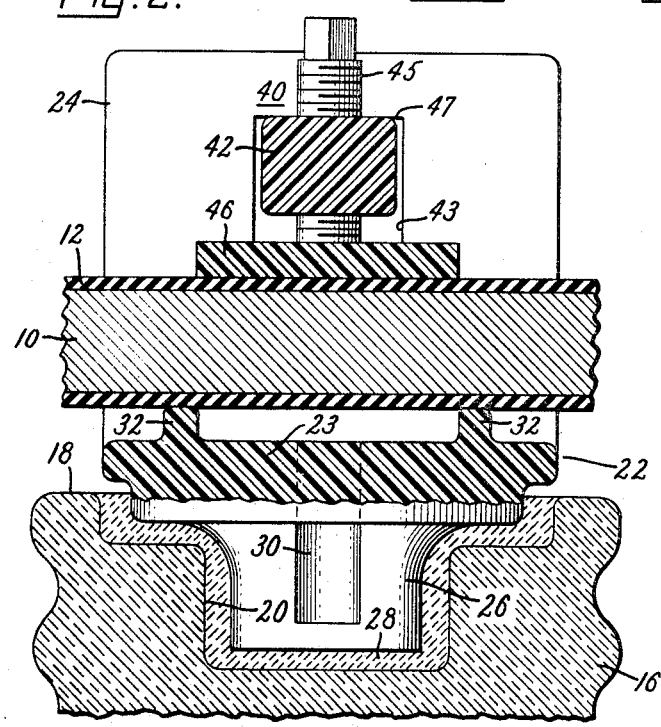
INVENTOR.
BARTHOLOMEW CLOSE,
BY
William Freedman
ATTORNEY

United States Patent Office 3,519,732
Patented July 7, 1970

3,519,732
BUS STRUCTURE COMPRISING A CLAMPING BRACKET AND A COATED ELECTRIC BUS BAR
Bartholomew Close, Prospect Park, Pa., assignor to General Electric Company, a corporation of New York
Filed July 24, 1969, Ser. No. 844,366
Int. Cl. H01b 17/18
U.S. Cl. 174—156                          3 Claims

ABSTRACT OF THE DISCLOSURE

Means for clamping to a support a bus bar that is covered with an unbroken coating of insulation. The bus bar is positioned on a U-shaped bracket having arms located at opposite edges of the bus bar. A reaction bar extends through aligned openings in the arms, and screws threaded into the reaction bar force the bus bar against the bight portion of the U-shaped bracket. A bearing plate between the ends of the screws and the bus bar protects the insulating coating on the bus bar from damage by the screws.

---

This invention relates to means for clamping an electric bus bar to an insulating support and, more particularly, relates to clamping means of this type which is especially suited for clamping a bus bar that has an unbroken insulating coating thereon.

To reduce electrical clearance requirements, bus bars have been provided with a thin coating of electrical insulation. To achieve maximum reductions in electrical clearance, it is important that the insulating coating completely cover all external surfaces of the bus bar and be unbroken by any structure penetrating the coating.

An object of my invention is to provide, for such a bus bar, simple and inexpensive clamping means which is capable of firmly clamping the bus bar to its support without penetrating the insulating coating on the bus bar and without requiring any holes in the bus bar.

Another object is to provide clamping means of this type which permits the bus bar to expand and contract along its length in response to temperature changes but effectively resists any lateral movement of the bus bar in response to magnetic forces.

In carrying out the invention in one form, I provide a bus bar having an insulating coating thereon, and a U-shaped bracket comprising a bight portion and a pair of arms extending from the bight portion at its opposite ends. The bus bar is positioned on the bight portion in a location between said arms. The arms have aligned openings therein and a reaction bar extends through said openings. A pair of screws are threaded into holes extending through said reaction bar and have end surfaces located adjacent said bus bar. A bearing plate is provided between said end surfaces and said bus bar for transmitting clamping force from said screws to said bus bar. Rotation of the screws clamps the bus bar between said bight portion and said bearing plate and urges said reaction bar against a wall of said openings in the arms of the bracket.

For a better understanding of the invention, reference may be had to the following description taken in conjunction with the accompanying drawing, wherein:

FIG. 1 is a cross sectional view through bus structure comprising clamping means embodying one form of my invention.

FIG. 2 is a sectional view along the line 2—2 of FIG. 1.

Referring now to the drawing, there is shown an electric bus bar 10 that has all of its external surfaces in the illustrated region completely covered with a coating 12 of insulating material bonded thereto. As shown in FIG. 1, the bus bar is supported on a grounded metal housing 14 by means including a post-type porcelain insulator 16 suitably secured to the metal housing 14. The insulator 16 has a top surface 18 and a cavity 20 formed in the top surface. Mounted atop the insulator 16 is a U-shaped bracket 22 of insulating material. This bracket has a bight portion 23 extending across the top surface of insulator 16 and a pair of upwardly-extending arms 24 located at opposite ends of the bight portion and integral therewith. Bracket 22 also includes a plug 26 extending downwardly from bight portion 23 and into cavity 20. A suitable insulating cement 28 between the plug and the cavity bonds the plug 26 to the insulator 16. This cement is introduced into the cavity 20 through spaced-apart holes 30 in the bracket which terminate short of the bottom of the plug.

Bus bar 10 is mounted on bracket 22 in a position between the arms 24. Ribs 32 forming a part of the bight portion 23 serve as a seat on which the bus bar 10 rests. The arms 24 are located closely adjacent the lateral edges of the bus bar so as to preclude any substantial lateral motion of the bus bar.

For clamping the bus bar 10 against bight portion 23, a clamping arrangement 40 is provided. This clamping arrangement 40 comprises a reaction bar 42 of insulating material which is received in a pair of aligned openings 43 provided in the arms 24 of the bracket. Two clamping screws 45 of insulating material are threaded into tapped holes in the reaction bar 42. Each of these screws has a flat surface at its lower end that bears against a bearing plate 46 of insulating material seated on the bus bar. Suitable recesses 50 in the top surface of the bearing plate 46 receive the lower ends of the screws 45. When the screws are rotated in the proper direction, they force the bearing plate 46 in a downward direction, thereby clamping the bus bar between bearing plate 46 and bight portion 23 of bracket 22.

Such clamping action forces the reaction bar upwardly into firm engagement with the top walls 47 of the openings 43. The reaction bar 42 is slotted at its opposite ends by means of slots 48 extending along the length of the reaction bar. This slotting imparts some flexibility to the end portions of the reaction bar which allow them to bend slightly. The tapped holes which receive the clamping screws 45 are so located that they extend through the slotted end portions. As a result, the bending of the end portions which accompanies clamping action tends to distort the threaded holes slightly and to produce a tighter fit between the holes and the screws 45. This tighter fit serves the desirable purpose of restraining the screws against accidental rotation after they have been operated to their desired position of adjustment for clamping.

It should be noted that the clamping arrangement does not perforate or otherwise impair the insulating coating 12, which completely covers the bus bar 10 in the region of the insulating support. The clamping screws 45 act on the bearing plate 46, which serves both as a barrier for protecting insulating coating 12 from the ends of the screws and to distribute the clamping force more uniformly over the bus bar surface. This clamping arrangement will allow the bus bar to expand and contract slightly along its length in response to temperature changes without damaging the support or the bus bar insulation 12. Such expansion and contraction simply causes the insulated bus bar to move slightly in a longitudinal direction with respect to bearing plate 46 and with respect to bracket 22. The recesses 50 in the bearing plate 46 prevent the bearing plate from shifting with respect to the screws 45 during such longitudinal movement of the bus bar. Lateral movement of the bus bar 10 is opposed by the arms 24, which engage the insulating coating 12 on the lateral edges of the bus bar. Laterally-directed forces tending to produce such lateral movement can result from magnetic interaction between closely-adjacent bus bars. Movement of the bus bar in a direction away from insulator 16 is prevented by clamping screws 45, which take forces in this direction in compression, transmitting them to the bracket 22 through reaction bar 42.

All of the clamping structure 40 is of electrical insulating material, and this reduces the likelihood of an arc-over in this region by precluding high voltages from being built-up on exposed metal parts atop insulator 16. This is explained in more detail in concurrently-filed application S.N. 844,365—Eichelberger et al., assigned to the assignee of the present invention.

While I have shown and described a particular embodiment of my invention, it will be obvious to those skilled in the art that various changes and modifications may be made without departing from my invention in its broader aspects; and I, therefore, intend herein to cover all such changes and modifications as well within the true spirit and scope of my invention.

What I claim as new and desire to secure by Letters Patent of the United States is:

1. An electric bus construction comprising:
   (a) a bus bar having an insulating coating thereon,
   (b) a U-shaped bracket having a bight portion and a pair of arms extending from the bight portion at its opposite ends,
   (c) said bus bar being positioned on said bight portion in a location between said arms,
   (d) said arms having aligned openings, each opening having a wall facing said bus bar,
   (e) a reaction bar of insulating material extending through said aligned openings,
   (f) a pair of screws of insulating material threaded into holes extending through said reaction bar and having end surfaces located adjacent said bus bar,
   (g) a bearing plate located between said end surfaces and said bus bar for transmitting clamping forces from said screws to said bus bar without allowing said screws to penetrate said insulating coating,
   (h) rotation of said screws clamping said bus bar between said bight portion and said bearing plate and urging said reaction bar against said walls of the openings in said arms.

2. The bus bar construction of claim 1 in which:
   (a) said reaction bar has end portions engaging said walls and slotted to permit a slight amount of bending of said end portions when said screws are rotated to apply clamping force to said bus bar, and
   (b) said threaded holes are located in said end portions so that bending thereof results in a tighter fit between said holes and said screws, thereby restraining said screws against accidental rotation after adjustment thereof to a clamping position.

3. The bus bar construction of claim 1 in which:
   (a) said reaction bar has end portions engaging said walls and slotted to permit a slight amount of bending of said end portions when said screws are rotated to apply clamping force to said bus bar, and
   (b) said threaded holes extend through the slotted portions of said reaction bar to protect against accidental rotation of said screws after adjustment thereof to a clamping position.

References Cited

UNITED STATES PATENTS 2,246,904  6/1941  Stockinger _____ 174—156 X
3,180,922  4/1965  Gallant et al. ____ 174—171 X

FOREIGN PATENTS

Add. 36,980  5/1930  France.

LARAMIE E. ASKIN, Primary Examiner

U.S. Cl. X.R.
174—171